United States Patent [19]
Crawford et al.

[11] Patent Number: 5,918,055
[45] Date of Patent: Jun. 29, 1999

[54] APPARATUS AND METHOD FOR MANAGING DIGITAL RESOURCES BY PASSING DIGITAL RESOURCE TOKENS BETWEEN QUEUES

[75] Inventors: Henry J. Crawford, Berkeley; Volker Lindenstruth, El Cerrito, both of Calif.

[73] Assignee: The Regents of the University of California, Oakland, Calif.

[21] Appl. No.: 08/795,592

[22] Filed: Feb. 6, 1997

[51] Int. Cl.⁶ .................................................. G06F 13/14

[52] U.S. Cl. ...................... 395/728; 395/727; 395/728; 395/729; 395/730; 395/731; 395/287; 395/292; 395/293; 395/821; 395/872; 711/150; 711/165

[58] Field of Search ..................................... 395/728, 186, 395/732, 200.8, 727, 729, 730, 731, 287, 292, 293, 821, 872; 340/825.05; 370/448, 445; 711/150, 165

[56] References Cited

U.S. PATENT DOCUMENTS

| | | | |
|---|---|---|---|
| 4,949,083 | 8/1990 | Hirabayashi | 340/825.05 |
| 5,001,472 | 3/1991 | Fischer et al. | 340/825.5 |
| 5,297,268 | 3/1994 | Lee et al. | 395/425 |
| 5,542,046 | 7/1996 | Carlson et al. | 395/186 |
| 5,564,062 | 10/1996 | Meaney et al. | 395/732 |
| 5,758,075 | 5/1998 | Graziano et al. | 395/200.8 |

*Primary Examiner*—Ayaz R. Sheikh
*Assistant Examiner*—Frantz B Jean
*Attorney, Agent, or Firm*—Flehr Hobach Test Albritton & Herbert LLP; William S. Galliani

[57] ABSTRACT

A method of managing digital resources of a digital system includes the step of reserving token values for certain digital resources in the digital system. A selected token value in a free-buffer-queue is then matched to an incoming digital resource request. The selected token value is then moved to a valid-request-queue. The selected token is subsequently removed from the valid-request-queue to allow a digital agent in the digital system to process the incoming digital resource request associated with the selected token. Thereafter, the selected token is returned to the free-buffer-queue.

14 Claims, 6 Drawing Sheets

APPARATUS AND METHOD FOR MANAGING DIGITAL RESOURCES BY PASSING DIGITAL RESOURCE TOKENS BETWEEN QUEUES

This invention was made with Government support under Grant (Contract) No. DE-FG03-90ER40571 awarded by the Department of Energy. The Government has certain rights to this invention.

BRIEF DESCRIPTION OF THE INVENTION

This invention relates generally to the management of access to digital resources in digital systems. More particularly, this invention relates to a technique of controlling access to digital resources by controlling tokens which are assigned to define the digital resources.

BACKGROUND OF THE INVENTION

This invention relates generally to the management of access to digital resources in digital systems. The term digital system is intended to refer to any system that includes or is operated by a digital logic circuit or hardware state machine. Thus, the digital system may be a network interface, a network switch, a computer program, a computer, a network of computers, and the like. Digital systems of this type may include a number of digital agents and a number of digital resources. As used herein, a digital agent refers to a digital element that requests a digital resource or responds to a request received from another digital agent. Examples of digital agents in a digital system include an input/output device on a system bus, a computer on a network, and the like. As used herein, a digital resource is a memory space or computational state. For example, the digital resource may be a buffer slot associated with a digital agent. Access to the digital resource is controlled by the digital agent.

An arbitration mechanism must be established to determine what digital agent can have access to a digital resource at any given time. For example, a number of agents in a digital system may simultaneously contend for access to a single digital resource, say a buffer slot of an input/output interface.

Figure 1:
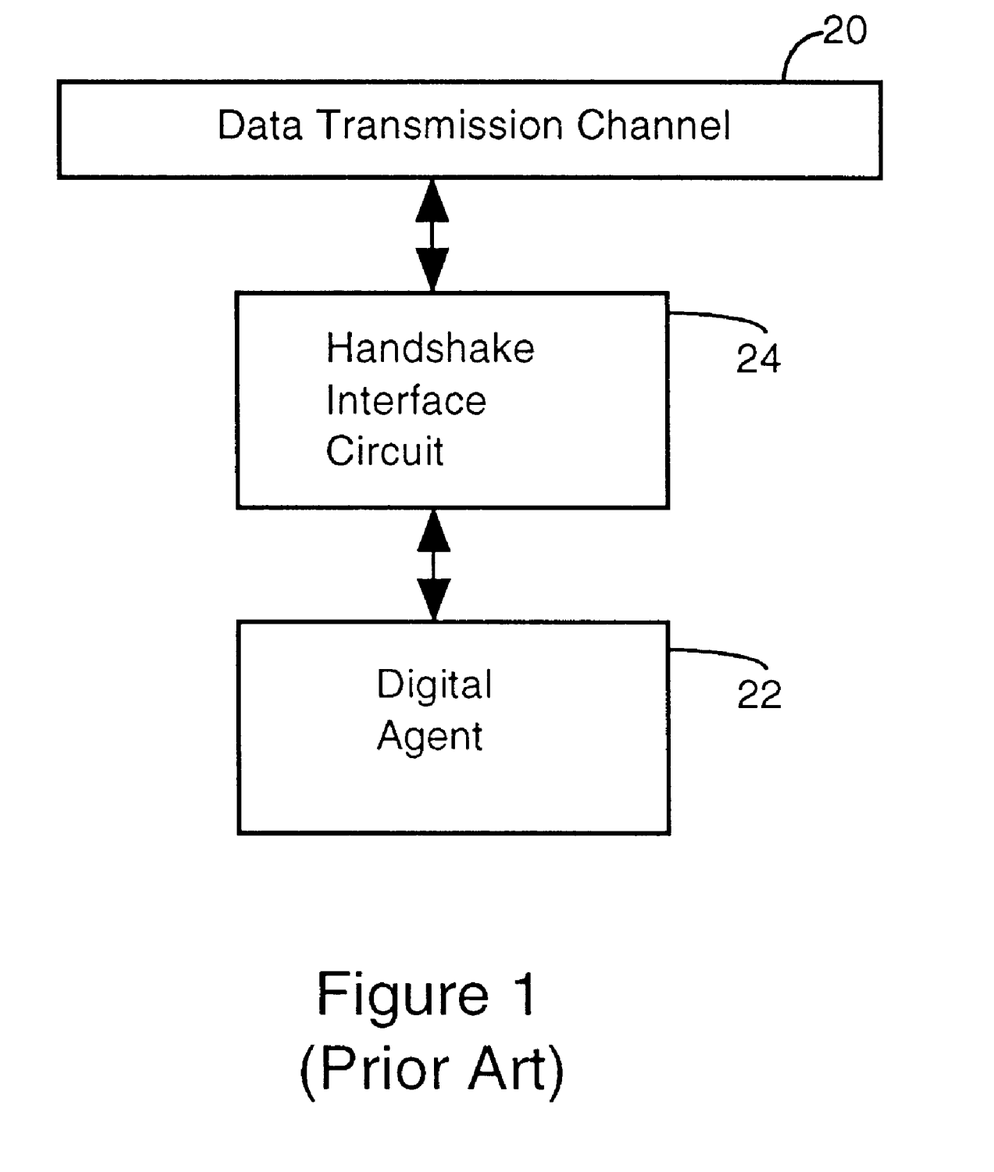
FIG. 1 is a general illustration of a prior art technique for managing digital resources in a digital system.

Prior art arbitration mechanisms for digital resources typically rely upon some type of acknowledgment protocol. FIG. 1 illustrates a simple prior art digital system. A data transmission channel 20 routes a digital resource request to a digital agent 22. A handshake interface circuit 24 is used to arbitrate the access to the digital agent 22. The handshake interface circuit 24 receives the digital resource request and determines whether it can be processed. If the digital agent 22 is available, the handshake interface circuit 24 reserves the appropriate buffer resources for the pending data transmission. It may then send a request for control of the data transmission channel 20. This request for control of the data transmission channel 20 is then processed by an arbitration mechanism (e.g., a microprocessor). The arbitration mechanism subsequently passes an acknowledgment to the handshake interface circuit 24, indicating that it may control the data transmission channel 20 to obtain the information corresponding to the initial digital resource request. The information is subsequently transmitted to the handshake interface circuit 24 via the data transmission channel 20 for subsequent processing by the digital agent 22.

This simple example of a request, acknowledgment, send operation over a data transmission channel 20 demonstrates a "handshake" operation that typically transpires before access is provided to a digital resource of a digital system. Arbitration mechanisms, whether "handshakes", "messages", "locks", or related techniques, are used in the prior art to control access to digital resources. The problem with prior art digital resource management schemes of this type is that they can be relatively complex and slow.

Accordingly, it would be highly desirable to simplify the design of digital systems by providing a digital resource management technique that does not rely upon handshakes, locks, or related techniques.

SUMMARY OF THE INVENTION

The invention is a method of managing digital resources of a digital system by reserving token values for certain digital resources in the digital system. A selected token value in a free-buffer-queue is then matched to an incoming digital resource request. The selected token value is then moved to a valid-request-queue. The selected token is subsequently removed from the valid-request-queue to allow a digital agent in the digital system to process the incoming digital resource request associated with the selected token. Thereafter, the selected token is returned to the free-buffer-queue.

In accordance with the invention, a digital system is controlled by the population of various token stores. Every state of the digital system is described by the state of the token stores. If a resource request has a token, the resource request is guaranteed the availability of the specified resource and requires no verifying response from the resource. All transactions take the form of single, complete instructions which means that pathways are not locked during data transmission. Consequently, the invention allows pipelined, lock-free, communication between any number of asynchronous agents. Thus, the invention avoids handshakes and other high-overhead communication protocols. Moreover, the invention avoids resource locks that plague multi-processor digital systems.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 2:
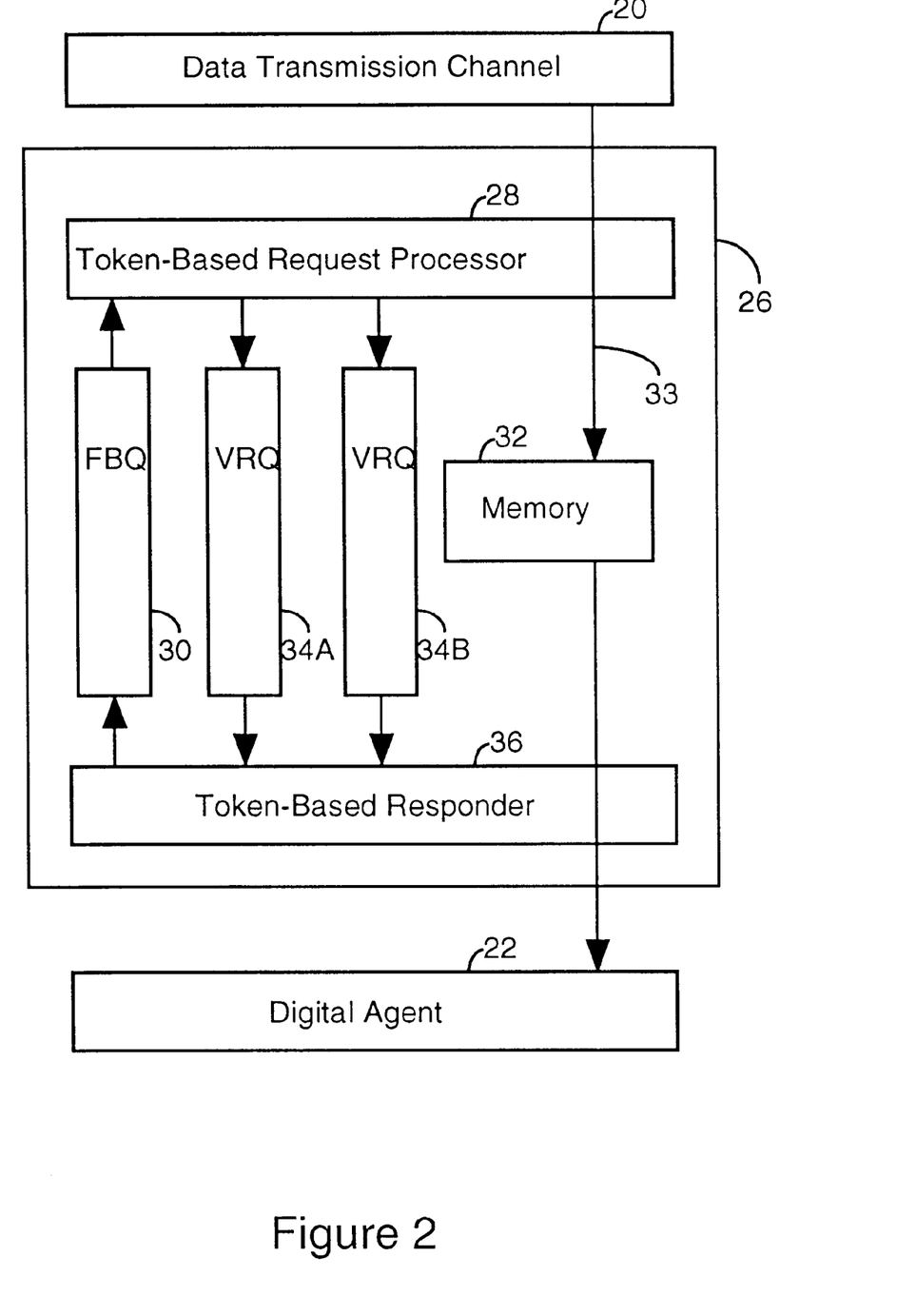
FIG. 2 illustrates a token controller in accordance with an embodiment of the invention.

FIG. 2 illustrates a token controller 26 in accordance with an embodiment of the invention. The token controller 26 is positioned between a data transmission channel 20 and a digital agent 22. The token controller 26 is used in lieu of a handshake interface circuit 24, as shown in the prior art system of FIG. 1.

As will become apparent, the token controller 26 of the invention may be used in any digital system. By way of example, assume that the token controller 26 is used as a network bridge. Networks such as Ethernet, SCI, SerialExpress and ATM produce packet traffic on a data transmission channel 20. A prior art handshake interface circuit 24 monitors the packet traffic to identify packets of information addressed to its corresponding digital resource or agent 22 (e.g., a computer). The handshake interface circuit 24 captures appropriately addressed packets and stores them in a buffer. If a sequence of packets exceeds the available buffer space, either flow control methods have to slow down the packet transmission or data will be lost. The performance of the packet receiver (i.e., the handshake interface circuit 24 in the prior art and the token controller 26 of the present invention) is substantially determined by the technique that determines the availability and location of free input buffers. As indicated above, the prior art relies upon handshakes, messages, locks, or related techniques to control this operation. In contrast, the present invention controls this operation through the use of locally controlled tokens.

In accordance with the invention, a token is associated with each digital resource. In the present example, a token is assigned for each buffer slot available for packet traffic. In other words, the digital resources in this example are the various buffer slots in memory 32. A token-based request processor 28 performs a prior art operation of interfacing with the data channel 20. Thus, in the example of a network bridge, the token-based request processor 28, as prior art devices, observes traffic on the data transmission channel 20 to identify packets of data addressed to its corresponding digital agent. If such a packet is identified, instead of relying upon some type of interactive handshake technique, as in the prior art, the token-based controller 28 has prior knowledge of the availability and identity of buffer resources. This is accomplished by reading one token from the free-buffer-queue (FBQ) 30 before the first incoming packet is received. If a token is available in the free-buffer-queue 30, that means that there is a digital resource available to accept the packet. In the present example, the digital resource is a buffer slot in memory 32.

If a token is available identifying a free buffer resource, then the data transmission channel 20 places the packet of information directly in memory 32, as shown with arrow 33. In particular, it places the packet of information at a memory 32 location corresponding to the token value selected by the token-based request processor 28. For example, suppose a first token defining the first memory buffer space has been read from the free-buffer-queue 30. The corresponding packet of information is stored beginning at this first address location until some fixed offset (e.g., 64 bytes) from the first address location. After the packet has been transferred, the request processor 28 moves the token identifying the target buffer to a valid-request-queue 34A.

The digital agent 22 operates by virtue of the token-based responder 36 to fetch a token from the valid-request-queue 34. It then retrieves, directly from memory 32, the packet of information corresponding to the fetched token. Relying upon the present example, the token-based responder 36 fetches the first token and then fetches from the memory 32 the information from the first address location until the fixed offset from the first address location. Afterwards, the token-based responder 36 pushes the token into the free-buffer-queue 30.

Thus, it can be observed that the control of access to the memory 32 is managed by the availability of tokens, which are either positioned in the free-buffer-queue 30 or the valid-request-queue 34A. Suppose the memory 32 has 16 buffer slots to receive packets of information. In this case, the free-buffer-queue 30 and the valid-request-queue 34A must each be able to hold 16 values. Assuming that the free-buffer-queue 30 and the valid-request-queue 34A are implemented as First-In-First-Out (FIFO) data structures with a width of log2(N), and N equals the 16 slots, then each queue 30 and 34A will be 4 bits wide Observe that tokens are assigned as data is accepted. If a token is not available in the free-buffer-queue 30, then a packet is rejected. Thus, no handshake is required to prevent overflow. Instead, all control is local. The token flow control is pipelined, hiding propagation delays of the tokens in the token stores—the free-buffer queue 30 and the valid-request-queue 34A, provided that there is at least one token in each store.

A First-In-First-First-Out (FIFO) structure offers a simple way of determining the availability of resources. In addition, it provides a simple mechanism for implementing a first-come-first served sequencing. FIFOs are a standard building block in digital electronics which are available at very low cost. On the other hand, the FIFO is not the only possible token store, many other implementations such as stacks are possible.

It is possible to have several token-based responders 36 process requests from the same or multiple valid-request-queues 34. Similarly, it is possible to have several token-based request processors 28 accept requests from several physical interfaces, relying upon the same or multiple free-buffer-queues 30.

Note that the buffer space is directly related to the throughput or processing rate of requests. Therefore, it is possible to control the processing rate by artificially reducing the number of tokens in the free-buffer-queue 30 of a given data transmission channel 20, thus limiting the maximum number of outstanding requests in the buffer request queue. This allows one to partition available bandwidth. Since the token concept can manage multiple queues, priority queues are also possible. FIG. 2 illustrates that multiple valid-request-queues 34A, 34B may be used. One valid-request-queue 34A may preferentially receive tokens from the token-based request processor 28 and preferentially have those tokens processed by the token-based responder 36.

Figure 3:
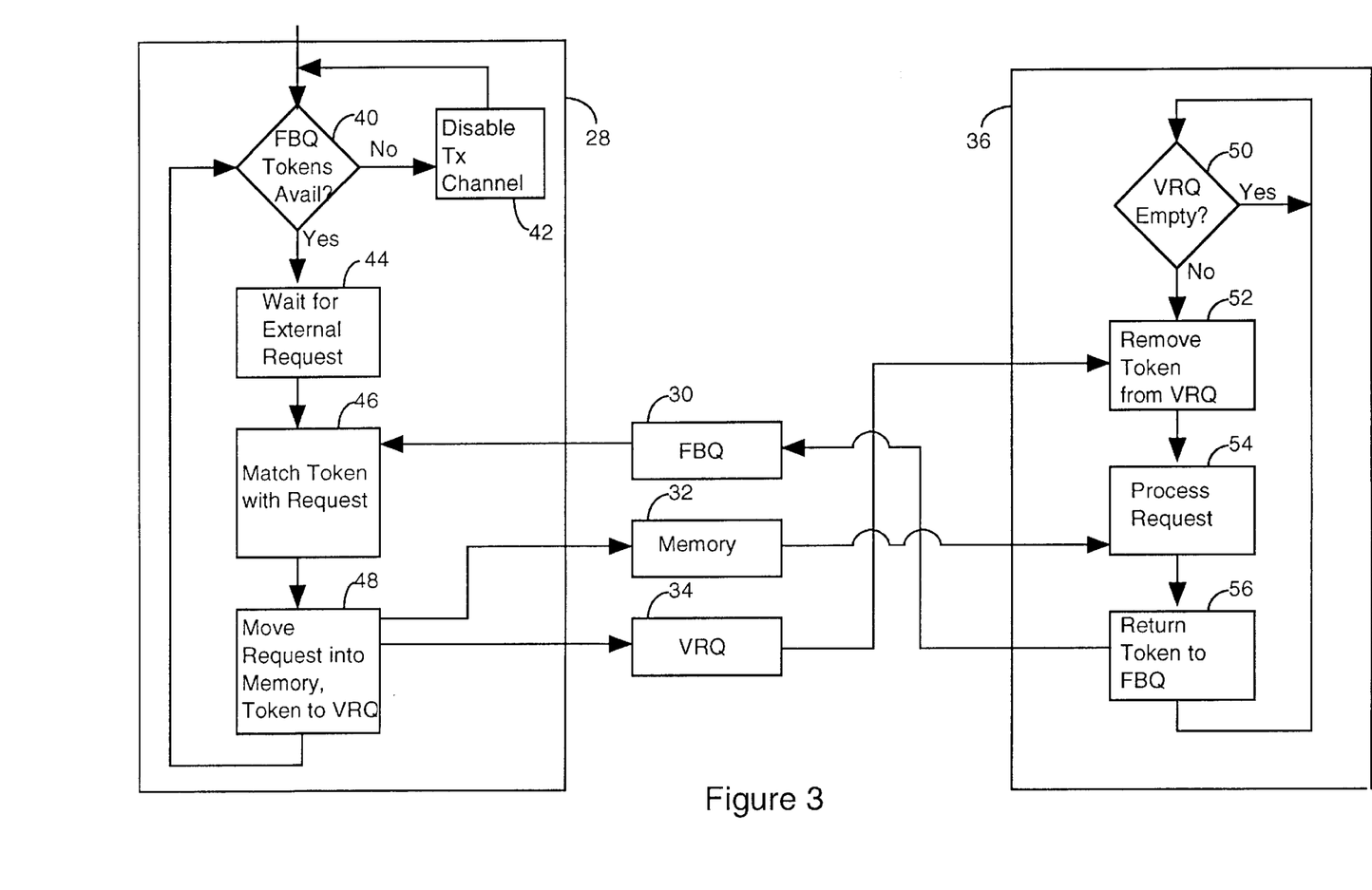
FIG. 3 illustrates processing operations associated with a token controller in accordance with an embodiment of the invention.

The foregoing operation is more fully appreciated with reference to FIG. 3. FIG. 3 illustrates the processing performed by the token-based request processor 28 and the token-based responder 36. The token-based request processor 28 attempts to read a token from the free-buffer-queue (step 40). If a token is not available, further requests are blocked as the data transmission channel 20 is disabled (step 42). A disabled data transmission channel typically acknowledges all received requests with a request to retry the transaction at a later time or disables the peer transmitter. When tokens are available, a wait state is entered to wait for request (step 44). When a request is received, a token is matched with the request (step 46). Thereafter, the request (e.g., the received packet of information) is moved into the memory 32 space specified by the token and the token is moved to the valid-request-queue (step 48). Control then returns to step 40.

The token-based responder 36 has an inverse operation. It operates to determine whether the valid-request-queue is empty (step 50). If the queue is empty, then it is continually checked until a token arrives. When a token arrives, it is removed from the valid-request-queue (step 52). The request in memory 32 at the location specified by the token is then fetched for processing (step 54). Thus, memory 32 may be implemented as a multi-ported memory that is addressed by token values. The processing of the request entails passing it to the digital agent 22 (not shown). Upon completion of the request processing, the token is pushed back into the free-buffer-queue 30 (step 56), thus making its buffer available to store new requests.

Figure 4:
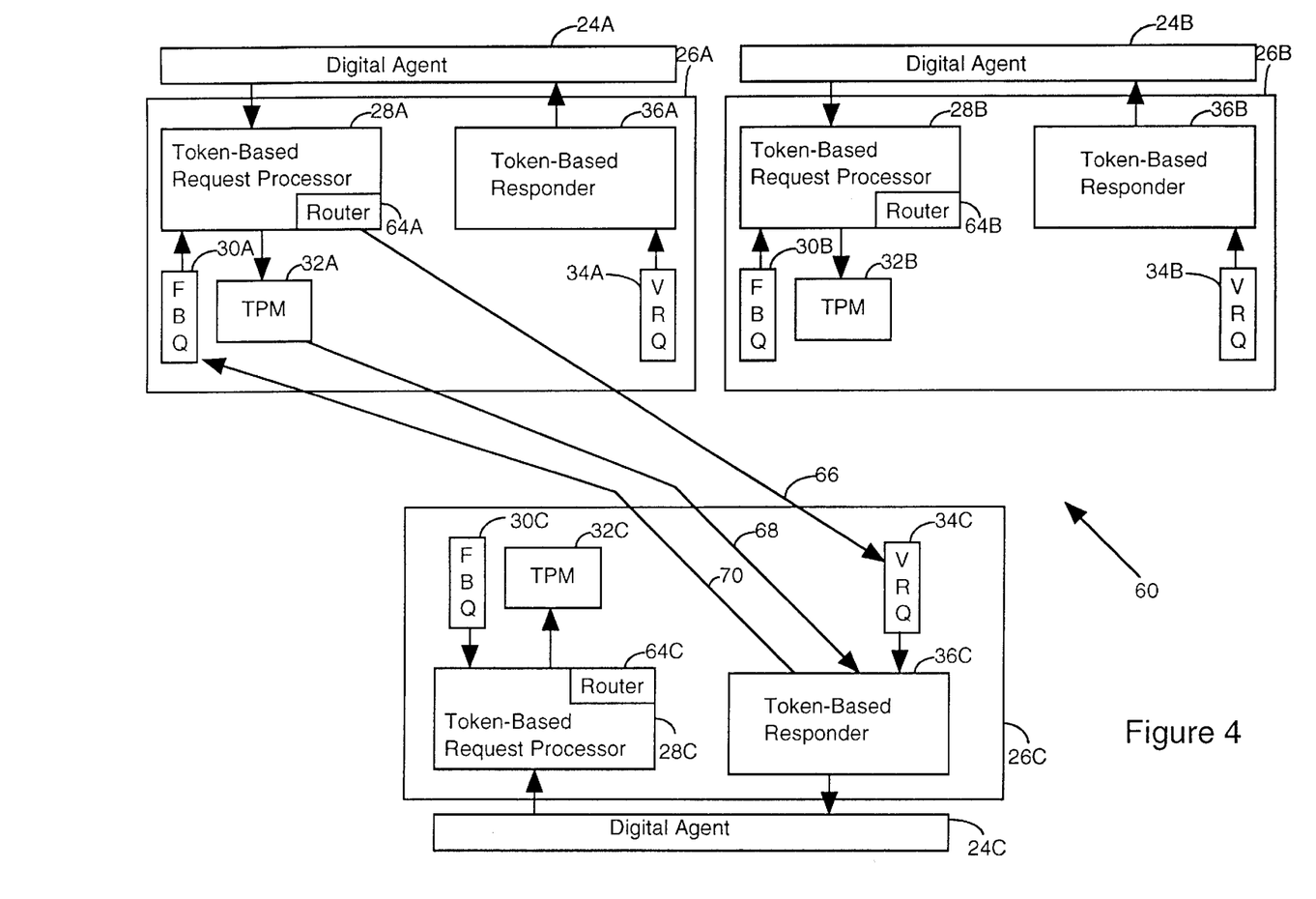
FIG. 4 illustrates a digital system incorporating multi-port token controllers, in accordance with an embodiment of the invention.

The example system of FIGS. 2 and 3 describes a 16 slot (N=16) system where each slot is either used or unused (M=2 states (used/unused)). Each resource is represented by a token, simply an integer number. Sixteen tokens are required to unambiguously identify any of the N=16 digital resources (slots). Two token stores are required to define the token state (M=2 states): one store for used tokens (e.g., the valid-request-queue 34) and one store for unused tokens (e.g., the free-buffer-queue 30). This system can be used as a building block for larger systems. FIG. 4 illustrates a full-duplex three-port packet switch system 60 that is completely managed by tokens in an M=3 system. This concept is not limited to M=3, but can be expanded to any size.

Each token controller 26A, 26B, 26C of FIG. 4 includes a triple-port memory 32. The triple-port memory 32 is used as an elasticity buffer for any of the incoming/outgoing packets. The basic difference between this and the previously described M=2 scenario is that there are two different fields within one token. One field identifies the buffer-ID (memory address) in the triple port memory and the other field identifies the token controller (either 26A, 26B, or 26C). The combination of the information in the two fields uniquely identifies any buffer resource in the system. Because the free-buffer-queue defines the agent implicitly, it does not need to store the agent type. Therefore, in this embodiment the valid-request-queue is wider (by 2 bits or three states) than the free-buffer-queue.

FIG. 4 illustrates a digital agent (e.g., a network) 24A passing data to a token-based request processor 28A. As described above, the token-based request processor 28A attempts to fetch a token from its corresponding free-buffer queue 30A. If a token is available, the passed data is loaded into the triple-port memory 32A at the location specified by the token. Now assume that the passed data is intended for digital agent 24C. That is, the digital agent 24A intends to pass a packet of data to digital agent 24C for processing. The router 64A of the token-based request processor 28A recognizes the address of digital agent 24C that is associated with the information that is passed to it. It pushes a token into the valid-request-queue 23C of token handler 26C, as shown with arrow 66. The token in the valid-request-queue specifies the source of the token (token handler 26A) and the buffer resource (memory location in triple-port memory 32A) which contains the information to be processed. Observe that each queue on this three port switch is being written to by two agents. For example, the valid-request-queue 34C is filled by router 64A and router 64B. Possible contention can be avoided by time slicing the push operations allocating even clock cycles to router 64A and odd clock cycles to router 64B. Only one token needs to be passed per request and therefore this implementation is not going to cause a token flow bottle neck.

The token-based responder 36C reads the token from its valid-request-queue 34C. It then accesses the information, as shown with arrow 68. Afterwards, it returns the token to the free-buffer-queue 30A, as shown with arrow 70. All communications in the network switch system 60 are executed in this manner.

The concept and operation of the invention have now been fully described. Attention presently turns to additional implementations of the concepts of the invention. All multi-processor architectures require buffer resource management and message passing for synchronization. Typically, buffer states and message queues are managed through global state tables, which are protected by locks. These locks are usually implemented using atomic transactions, which put a burden on the bus system. In addition, the transactions are not pipelined. If a lock is asserted, other requesters are stalled. The probability for such a lock stall increases with the system load; the system performance does not scale with its load. In order to prevent locks from pending due to task rescheduling, the lock set/release routines are usually encapsulated by system calls preventing the task from being interrupted. However, this method makes execution of locks on the requester side relatively expensive.

Lock-based resource management has a fairly high system overhead. The token concept allows implementing any buffer resource management or message queue system without any locks. It also allows those token transactions to be write-only transactions, which means they can be posted. Consequently, a token based multi-processor system is totally pipelined and scales well with its load.

The token buffer management system can be adopted to a multi-processor architecture by setting up a software token store. Like the FIFO in the hardware case, it is possible to implement a software FIFO, which requires only (posted) writes across any given bus boundary. Such a FIFO token store forms the building block for the token queues.

Figure 5:
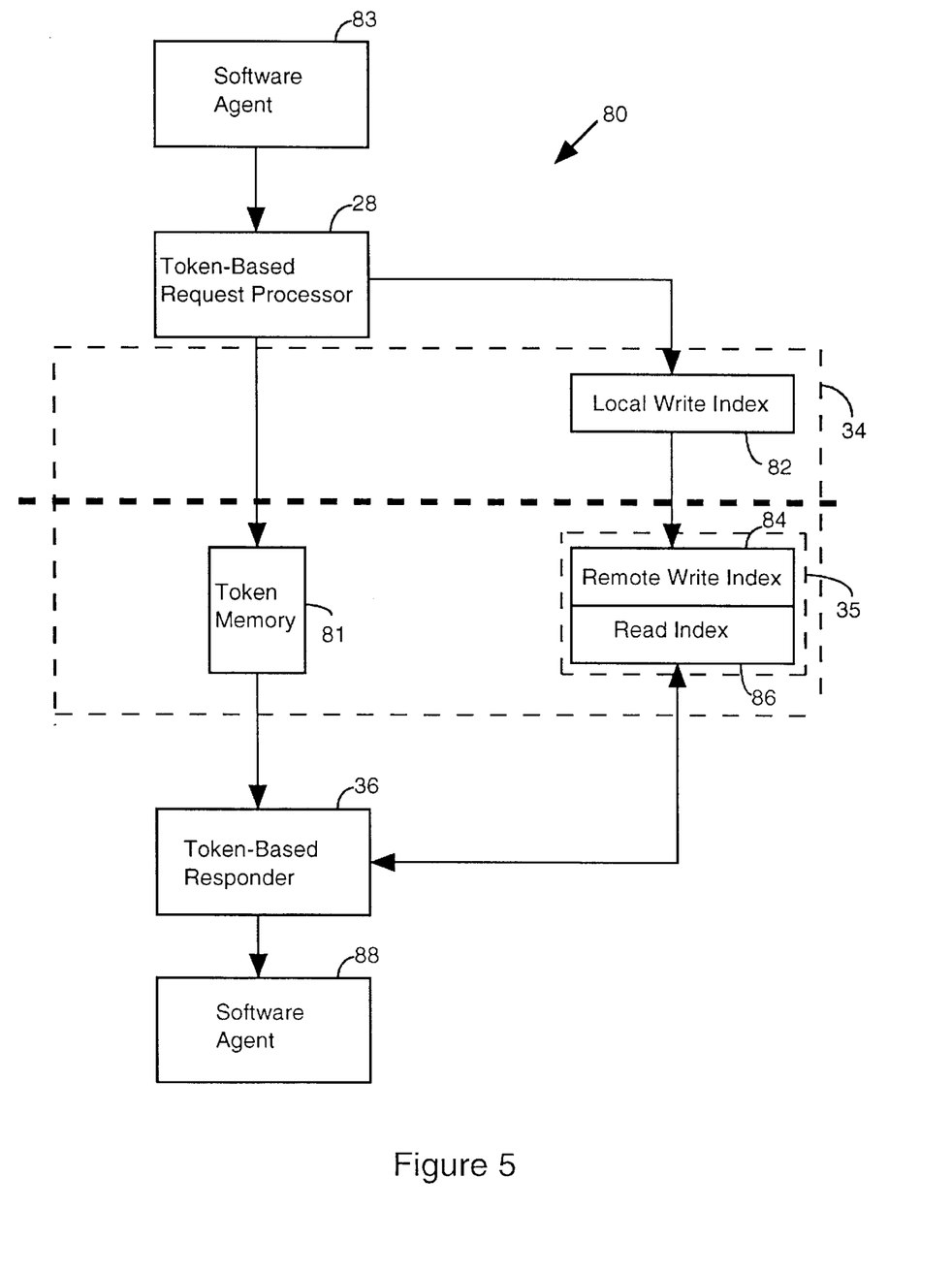
FIG. 5 illustrates a software-based queue to be used as a token store building block with an embodiment of the invention.

FIG. 5 illustrates a software implementation 80 of a valid-request-queue 34. As in the previous embodiments, a valid-request-queue 34 receives tokens from a token-based request processor 28, which communicates with a software agent 83. The tokens from the valid-request-queue 34 are then fetched by a token-based responder 36, which uses the token to convey information to a software agent 88. In the software embodiment of the invention, the valid-request-queue 34 is implemented as a set of index terms with bound values. In other words, the index can only be incremented to a defined value (the maximum number of defined tokens minus one before it wraps to zero). When a request is received at the token-based request processor 28, the local write index 82 is incremented. The token is written to the location in the token memory 81 specified by the updated local write index. The incremented value is then passed to the remote write index 84. The read index 86 then passes the existing index value to the token-based responder 36, allowing the token-based responder 36 to obtain the specified information from the token memory 81.

The status of the valid-request-queue 34 is defined by the difference between the read and write pointers. A FIFO with N words has N+1 states (states 0 through N, where state 0 is empty and state N is full). Therefore, the write-only software FIFO for N tokens needs to be at least N+1 elements large in order to avoid ambiguities between full and empty states. An empty state is defined as WritePointer==ReadPointer. The full state is defined as WritePointer==ReadPointer-1 taking the appropriate index wrapping into account. Observe that the full state does not have to be determined because the token concept prevents overflow.

As previously indicated, if the token-based request processor 28 needs to write to the FIFO, it uses the defined global FIFO data base address to write (post) the data word. Then, it writes the incremented write index to both the local write index 82 and remote write index 84, thus making the new data word visible to the token-based responder 36. Consequently, at most two remote write transactions are required per FIFO transaction, or, depending on the bus type between the two handshaking agents, a message can be passed typically within less than a microsecond. If more than one data word or token is to be transferred, the write index update transaction can be amortized over several data write transactions.

The token-based responder 36 compares the read and write pointers to determine the FIFO empty state. If asynchronous notification is required, the FIFO write index field, which can be located anywhere in the mutual address space, can be placed into a memory region that acts as a mailbox interrupt (it fires the local interrupt upon any write transaction to the memory region).

The operation of the system of FIG. 5 and similar systems is more fully appreciated with reference to a specific system. A typical multi-processor system contains a series of processors that receive and compute input data. The resulting output data is transmitted to higher level processors performing other tasks on combined output data sets or the output data is transmitted by appropriate interfaces to a network or a mass storage device. In any case, a typical processing element receives data and produces a different data set. Both the input and output data require proper flow control to avoid data overruns.

For example, in an image processing system, the source data controller is connected to a camera producing frames. Each CPU has a set of internal frame buffers available. The output of the first processing layer, where image pattern recognition algorithms are implemented, could be sent to a second, similar processing layer that performs motion analysis of the images found in the first layer. The output of the second layer could be a storage system recording the type and velocity vector of identified objects. In military applications, this system can be used to control and steer cruise missiles.

The buffer flow control implemented by the token resource management scheme of the present invention is similar between all interfaces exchanging data in this system. Each processing element or interface has a set of identical buffer elements. Each buffer element is represented by a token. In the system sketched above, each processor has at least two valid queues that implement the software FIFO 80. One of these queues resembles a priority queue of buffers that are to be processed at priority. The appropriate processor reads this queue first for valid requests. Both queues have the same depth, which is the maximum number of tokens available. The data source (the camera interface or the appropriate lower processing layer) implements a free-buffer-queue per processor. It is at its discretion to which CPU the next data request is sent. It can implement load dependent algorithms using the fill status of the free-buffer-queues, minimizing the latency of any given request. Given the availability of a free buffer token, the data source pushes the appropriate input data directly into the input buffer of the appropriate processor. The input buffer is unambiguously identified by the token. After completion of the data transfer, the appropriate token is moved from the free-buffer-queue to the appropriate valid request queue. Note that the data output resembles a data source for the next layer, which is implemented similar to the data source shown.

The token resource management concept has been described in reference to the management of N identical resources. In the case of buffers, that means resources of fixed identical length. The token concept of the invention also allows implementation of variable length buffers. The basic method is to break up variable length objects into a multiple of fixed length buffers.

The foregoing image processing example can also be interpreted as a data acquisition and analysis filter. In that scenario, the data sources are digitizers that produce variable length data. The source data controller breaks that source data into a multiple of fixed length buffer slots. It knows how many tokens (buffer slots) each processor has available. If the source data requires M buffer slots, M tokens are taken from the appropriate free-buffer-queue. The raw data is then transferred to the appropriate buffers. This can be accomplished using a chain mode DMA controller pushing data into the local buffer slots of the analysis CPU. One chain entry will be required per buffer slot. Correspondingly, the resulting output data can be scattered in the input buffer or the destination processor.

The availability of the complete data set is communicated by pushing all tokens of all used buffers into the valid-request-queue of the target processor. In order to avoid race conditions, it is required to add a qualifier to the token value. This qualifier defines the sequence number of the given buffer slot within the data set. One defined qualifier is reserved to identify the last data page. In case of a non-empty valid-request-queue, the receiving processor reads tokens until the end of data set qualifier is received. This scheme works for any number of pages in a data set.

Note that all of the foregoing examples share the concept that they are managed by tokens, which are much smaller than the buffer resource itself. The position and handling of the buffer resource itself is completely independent of the tokens. However, the token concept can also be used to elegantly implement message passing queues.

Figure 6:
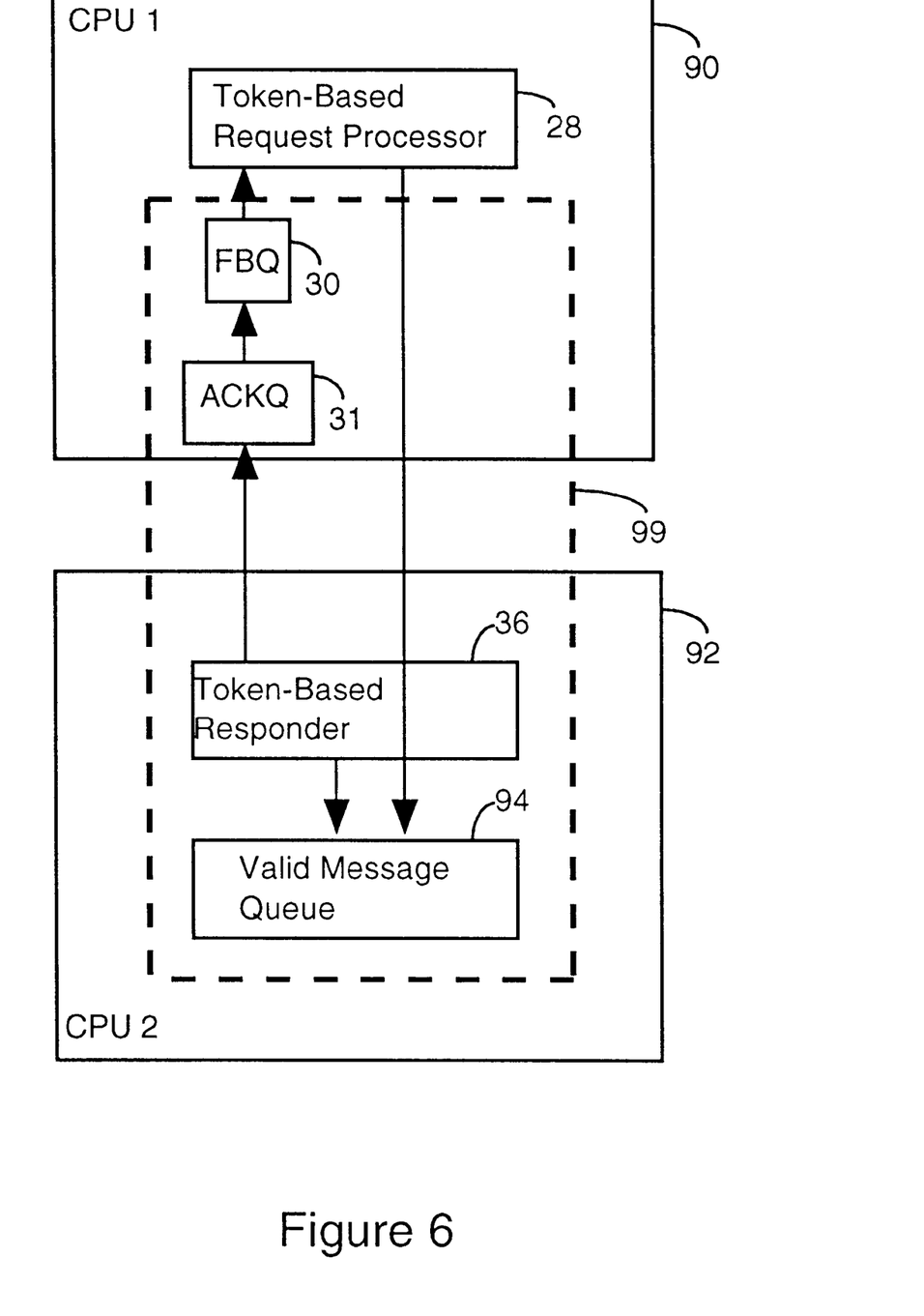
FIG. 6 illustrates a token controller in accordance with an embodiment of the invention.

FIG. 6 illustrates a token based message passing command interface. In this implementation, the token does not represent a buffer resource, but is the resource itself. The valid message queue 94 and the acknowledge queue (ACKQ) 31 are instantiations of the previously discussed software FIFO 80. CPU 1 90 includes a token-based request processor 28, which writes token messages to the valid message queue 94 on CPU 2 92. Since the valid message queue 94 can only be loaded when a token is available in the free-buffer-queue 30, it is guaranteed that it will not overflow. After a token is written to the valid message queue 94, the token-based responder 36 pushes the token back to the free-buffer-queue 30, or provides acknowledgment using the acknowledgment queue 31. Observe that in this case, due to the lack of a buffer pool 32, the width of the tokens in the free-buffer-queue 30 is zero bits. In other words, the free-buffer-queue 30 in the token message interface 99 is reduced to the pointer index pair 35 of the software queue 80.

There are obvious trade-off considerations between the different embodiments of the token concept. The message token implementation requires the messages to be processed in the order they are received. The token based resource identification implementation does not have that constraint. However, it requires one additional level of pointer indirection. The resource address has to be calculated based on the base address of the resource pool and the resource ID as specified by the token. In many cases it is efficient to separate the buffer from the token management. This is especially the case if large buffers are in use and data is moved using direct memory access assistance, or if multiple priority request queues are implemented. Basically, the token message implementation is useful for command interfaces using short messages that can be efficiently transmitted by programmed input/output. The resource identification token implementation is best suited for larger buffer slots, which are filled by direct memory access engines or which require out-of-order processing. In any case, the token resource management allows implementation of the required flow control with minimal overhead.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A method of managing digital resources in a digital system, said method comprising the steps of:
  reserving token values for certain digital resources in said digital system;
  matching a selected token value in a free-buffer-queue to an incoming digital resource request;
  moving said selected token value to a priority valid-request-queue;
  preferentially removing said selected token value from said priority valid-request-queue to allow a digital agent in said digital system to process said incoming digital resource request; and
  returning said selected token to said free-buffer-queue.

2. The method of claim 1 wherein said moving step includes the step of moving a packet of data associated with said incoming digital resource request into a memory location corresponding to said selected token value.

3. The method of claim 2 wherein said moving step includes the step of moving said incoming digital resource request from said memory location to allow said digital agent to process said incoming digital resource request.

4. The method of claim 1 further comprising the step of blocking an incoming digital resource request when said free-buffer-queue is empty.

5. A digital system, comprising:
  (A) a transmission channel to route an incoming digital resource request;
  (B) a digital agent to process said incoming digital resource request; and
  (C) a token controller positioned between said transmission channel and said digital agent, said token controller including
    (1) a free-buffer-queue,
    (2) a valid-request-queue,
    (3) a memory,
    (4) a token-based request processor connected to said transmission channel, said free-buffer-queue, said valid-request-queue, and said memory, said token-based request processor being configured to
      (a) match said incoming digital resource request with a selected token value in said free-buffer-queue,
      (b) move said incoming digital resource request into said memory, and
      (c) place said selected token value in said valid-request-queue, and
    (5) a token-based responder connected to said free-buffer-queue, said valid-request-queue, said memory, and said digital resource, said token-based responder being configured to
      (a) move said selected token value from said valid-request-queue into said free-buffer-queue, and
      (b) route said digital resource request from said memory to said digital agent.

6. The apparatus of claim 5 wherein said token-based request processor is configured to block an incoming digital resource request when said free-buffer-queue is empty.

7. The apparatus of claim 5 wherein said token-based request processor selectively places high priority incoming digital resource requests into a priority valid-request-queue of a set of priority valid-request-queues, and said token-based responder preferentially removes tokens from said priority valid-request-queue.

8. The apparatus of claim 5 wherein said free-buffer-queue is constructed as a hardware-based First-In-First-Out device.

9. The apparatus of claim 5 wherein said valid-request-queue is constructed as a hardware-based First-In-First-Out device.

10. The apparatus of claim 5 wherein said free-buffer-queue is constructed as a software-based write-only FIFO using a write index cache.

11. The apparatus of claim 5 wherein said valid-request-queue is constructed as a software-based write-only FIFO using a write index cache.

12. A digital system, comprising:
  (A) a transmission channel;
  (B) a plurality of digital agents; and
  (C) a plurality of token controllers, each of said token controllers being positioned between said transmission channel and a selected digital agent of said plurality of digital agents, each of said token controllers including
    (1) a free-buffer-queue,
    (2) a valid-request-queue,
    (3) a multi-port memory,
    (4) a token-based request processor connected to said selected digital agent, said free-buffer-queue, and said multi-port memory, said token-based request processor being configured to
      (a) match an incoming digital resource request from said selected digital agent with a selected token value in its free-buffer-queue,
      (b) route said selected token value to a valid-request-queue of a destination token controller of said plurality of token controllers, and
      (c) move said incoming digital resource request into said multi-port memory, and
    (5) a token-based responder connected to said valid-request-queue and said transmission channel, and said selected digital agent, said token-based responder being configured to
      (a) read a specific token value from its valid-request-queue, said specific token value originating from a digital resource request generated by a source token controller, (b) receive said digital resource request from a multi-port memory of said source token controller, and (c) pass said digital resource request to said selected digital agent associated with said token-based responder.

13. The apparatus of claim 12 wherein said token-based request processor includes a router to route said selected token value to said valid-request-queue of said destination token controller.

14. The apparatus of claim 12 wherein said token-based responder is configured to route said specific token value to a free-buffer-queue of a source token controller.

* * * * *